United States Patent
Stahl

(10) Patent No.: US 8,238,279 B2
(45) Date of Patent: Aug. 7, 2012

(54) NETWORK CONTROLLER WAKE ON COMMUNICATIONS REQUEST

(75) Inventor: Michael Stahl, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 12/286,245

(22) Filed: Sep. 29, 2008

(65) Prior Publication Data
US 2010/0080158 A1 Apr. 1, 2010

(51) Int. Cl.
*G08C 17/00* (2006.01)
(52) U.S. Cl. .......................................... 370/311; 455/68
(58) Field of Classification Search .................. 370/338, 370/311; 455/68
See application file for complete search history.

(56) References Cited

U.S. PATENT DOCUMENTS

| | | | |
|---|---|---|---|
| 2008/0019344 A1* | 1/2008 | Palm et al. | 370/338 |
| 2009/0122736 A1* | 5/2009 | Damnjanovic et al. | 370/311 |
| 2010/0003927 A1* | 1/2010 | Chou et al. | 455/68 |

OTHER PUBLICATIONS

Intel Centrino Mobile Technology Wake on Wireless LAN (WoWLAN) Feature; Dated Sep. 14, 2008; pp. 1-6.

\* cited by examiner

*Primary Examiner* — Albert T Chou
(74) *Attorney, Agent, or Firm* — Sutherland Asbill & Brennan LLP

(57) ABSTRACT

When there are no network devices currently associated with a wireless network controller, the network controller may reduce power consumption by placing itself in a standby mode. In the standby mode, the network controller may place some of its components into a non-operational low power state, while keeping enough components in an operational state to receive and decode received communications requests from devices that may wish to become associated with it. This may involve placing the transmit chain, and in some cases the applications processor, into the low power state. When a communications request is detected, the network controller may restore the transmit chain and if necessary the applications processor to an operational state, and transmit a response to the communications request.

17 Claims, 3 Drawing Sheets

NETWORK CONTROLLER WAKE ON COMMUNICATIONS REQUEST

BACKGROUND

As the use of wireless communications networks becomes more pervasive, many of these networks are being placed into situations in which the network is inactive much of the time. For example, a wireless local area network (WLAN) in the home might be inactive during the time the resident is asleep or away at work. A WLAN in a coffee shop (e.g., a so-called 'hot spot') may be inactive during the hours the coffee shop is closed. To make sure that new devices can join the network at any time, the network controllers in these networks typically are in a fully operational state at all times, thus unnecessarily consuming power during extended periods of network inactivity.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
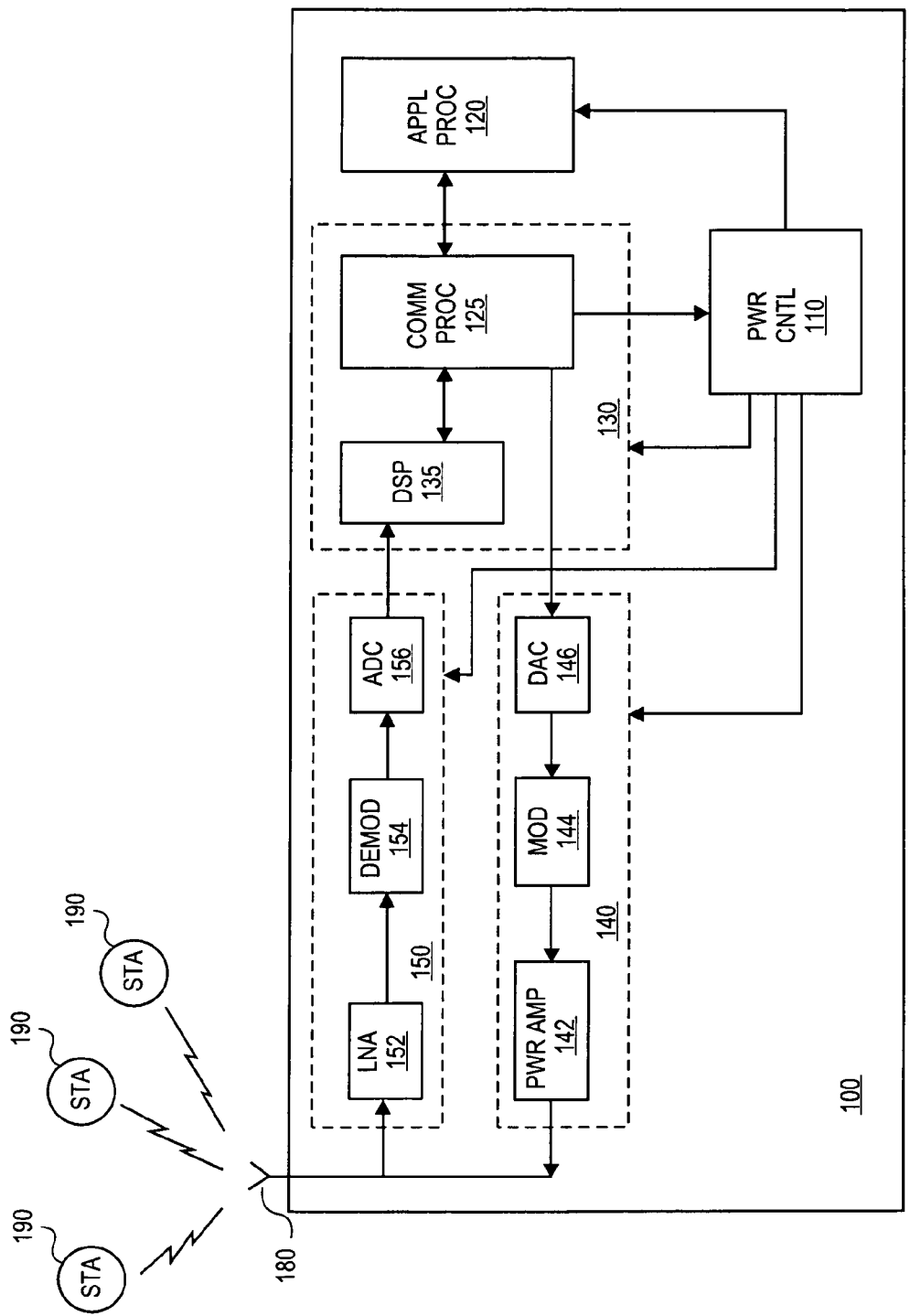
FIG. 1 shows a wireless network controller, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A computer-readable medium may include any mechanism for storing, transmitting, and/or receiving information in a form readable by a computer. For example, a computer-readable medium may include a tangible storage medium, such as but not limited to read only memory (ROM); random access memory (RAM); magnetic disk storage media; optical storage media; a flash memory device, etc. A computer-readable medium may also include a non-tangible propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile" wireless device is used to describe a wireless device that may be in motion while it is communicating.

Various embodiments of the invention may place a network controller in a standby mode after a period of network non-activity. While in this standby mode, the network controller may keep just enough circuitry active to receive and recognize communications requests from other wireless devices. Upon receipt of such a request, the network controller may activate additional circuitry to respond to the request and to possibly communicate further with the requesting device. The network controller may then remain active until another period of network non-activity causes it to go back into the standby mode.

FIG. 1 shows a wireless network controller, according to an embodiment of the invention. In the illustrated embodiment, network controller 100 may transmit and receive through its antenna 180 to communicate with, and control the communications of, network devices 190 that are each labeled STA in the figure. The network controller 100 may be any of various types of wireless communications devices, such as but not limited to an access point (AP), base station (BS), etc., that are used as a central control point to control and/or regulate communications by other devices within that network. This network controller is shown with a number of internal functional components. In some embodiments, each illustrated functional component may correspond with a definable physical component, such as a module or circuit. In other embodiments, all or parts of multiple functional components may be combined into a single physical component, or multiple physical components may be used to provide a single functional component.

The illustrated functional components are an application processor 120, a communications processing section 130, a transmit chain 140, a receive chain 150, and power control logic 110 that can selectively apply or remove operating power from at least some of the other functional components 120, 130, 140, and 150. At a more detailed level, receive chain 150 may comprise a low noise amplifier 152, a demodulator 154, and an analog-to-digital converter (ADC) 156, while transmit chain 140 may comprise a power amplifier 142, a modulator 144, and a digital-to-analog converter (DAC) 146. Similarly, communications processing section 130 may comprise a digital signal processor 135 and a communications processor 125. The communications processor 125 may be used to process data at the medium access (MAC) layer, including decoding of the protocol of various received transmissions. For example, the communications processor 125 may be able to determine if an incoming transmission contains the protocol indicating a communications request. For the purposes of this document, a "communications request" is a request to communicate with the network controller, from a device that is not already associated with the network controller. A probe request is one example, but other embodiments may use other types of communication requests. The communications processor 125 may also be able to send a signal to power control logic 110 indicating that a communications request has been received.

This feature may be useful in permitting a network controller to enter a standby mode during periods when there are no other wireless devices associated with the network controller, while still being able to detect when another device might wish to communicate with the network controller. Within the context of this document, the term "associated" refers to a wireless network controller and another wireless communications device establishing an agreed-upon temporary communications relationship with each other, such that they may communicate with each other following specific rules of format, protocol, timing, and frequency(s). In most such associations, the network controller controls when the other device may communicate with it, but there may also be instances in which the other device is able to communicate with it without such control. If no wireless network devices are associated with the network controller (some may have been deliberately disassociated due to lack of communication activity), the network controller may enter this standby mode in which it can receive but not transmit. The term "standby mode", as used herein, indicates a mode in which the transmit chain is in a non-operational low power state (and in some embodiments the applications processor may also be in a non-operational low power state), while the receive chain and communications processing section are still in an operational state. Maintaining operational power to the receive chain 150 and the communications processing section 130 permits incoming transmissions to be received and at least partially decoded even while the network controller is in the standby mode. Within the scope of this document, placing something into a non-operational low-power state may be accomplished by doing one or more of the following: 1) stopping the clock signal(s) to the relevant digital logic, 2) reducing the operational voltage to the circuitry, and/or 3) shutting off the operational voltage to the circuitry.

While in the standby mode, the network controller may continue to receive incoming transmissions, and to decode those transmissions at least enough to determine if the network controller has further interest in processing the incoming transmission. In some embodiments, the communications processor 125 may decode the incoming transmission, looking for a communications request that would justify waking up the rest of the network controller to transmit a response. When such a communications request is detected, a signal may be sent to the power control section 110 to wake up the rest of the network controller and resume normal operations so that a response to the communications request may be transmitted. Various limitations may be placed on just what incoming data will justify this resumption of normal operations. For example, resumption of normal operations might be triggered when the incoming data includes things such as, but not limited to: 1) a communications request addressed to this particular network controller, either with a unicast or multicast addressing format, (a directed communications request), or 2) a communications request that is not addressed to any particular network controller (a broadcast communications request). In some embodiments the communications processor 125 may be programmed to respond to only one of these types of communications requests, while in other embodiments it may be programmed to respond to either type. In some embodiments, a communications request that is addressed to another network controller but not to this network controller, may be considered as equivalent to not receiving a communications request, and will not result in waking up the network controller. In other embodiments, the network controller may have to wake up to determine that the communications request is addressed to another device.

Figure 2:
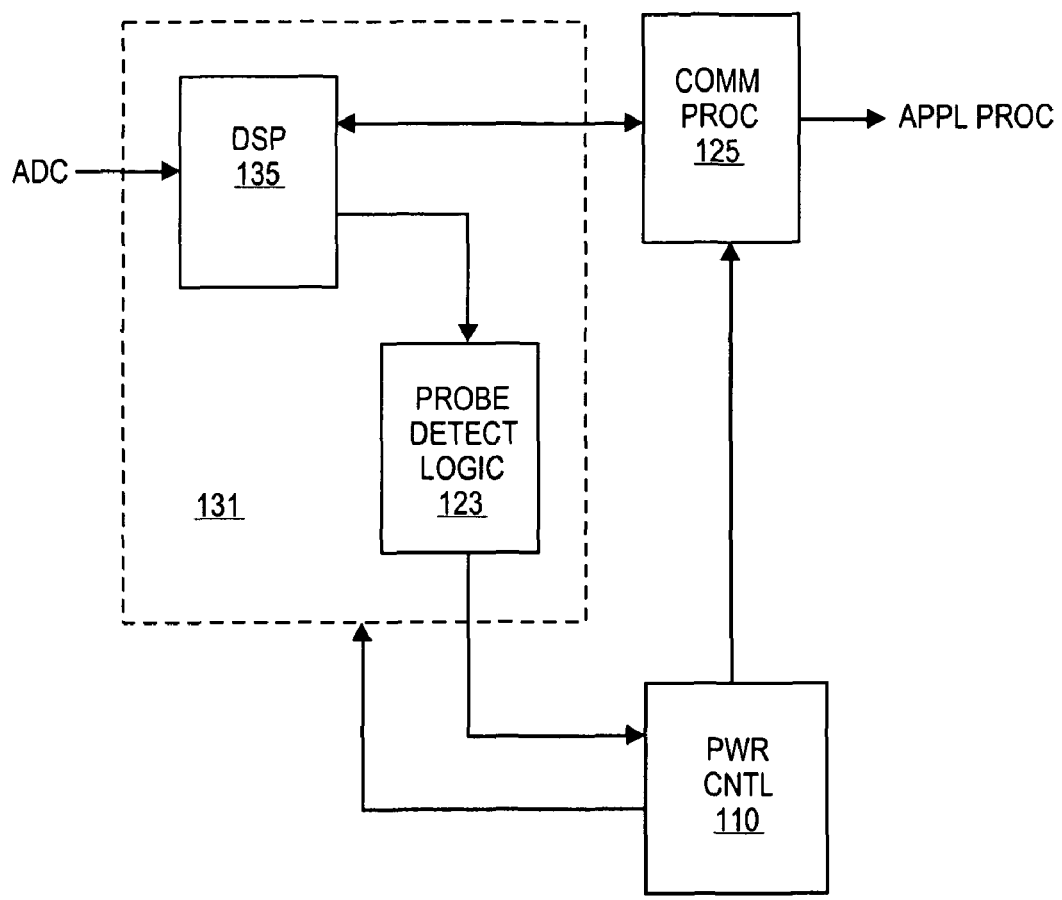
FIG. 2 show an alternative configuration of the communications processing section, according to an embodiment of the invention.

FIG. 2 show an alternative configuration of the communications processing section, according to an embodiment of the invention. In this design, probe detect logic 123 is used to detect when the incoming data stream contains a probe request that justifies taking the network controller out of the standby mode. Note: although the term 'probe' is shown in the drawings as an example, this also applies to any communications request as defined in paragraph. The probe detect logic 123 may then send a signal to the power control logic 110 when such a communications request is detected. This configuration permits placing the communications processor 125 in a low power non-operational state during the standby mode, while maintaining operational power to the probe detect logic 123. This effectively places the communications processor 125 outside the communications processing section 130, permitting the network controller to save even more power by shutting down the communications processor while in the standby mode. In some embodiments, the probe detect logic 123 may be programmable, to permit various types of communications requests to selectively trigger the activation signal to the power control logic. The probe detect logic 123 may be implemented in various ways, such as but not limited to: 1) discrete logic, 2) a state machine, 3) a processor that is smaller and simpler than the communications processor, 4) a combination of one or more of these, 5) etc. A possible disadvantage of the embodiment of FIG. 2 is that the probe detect logic may not have the complexity to decode the wide variety of incoming data streams that the communications processor can decode.

Figure 3:
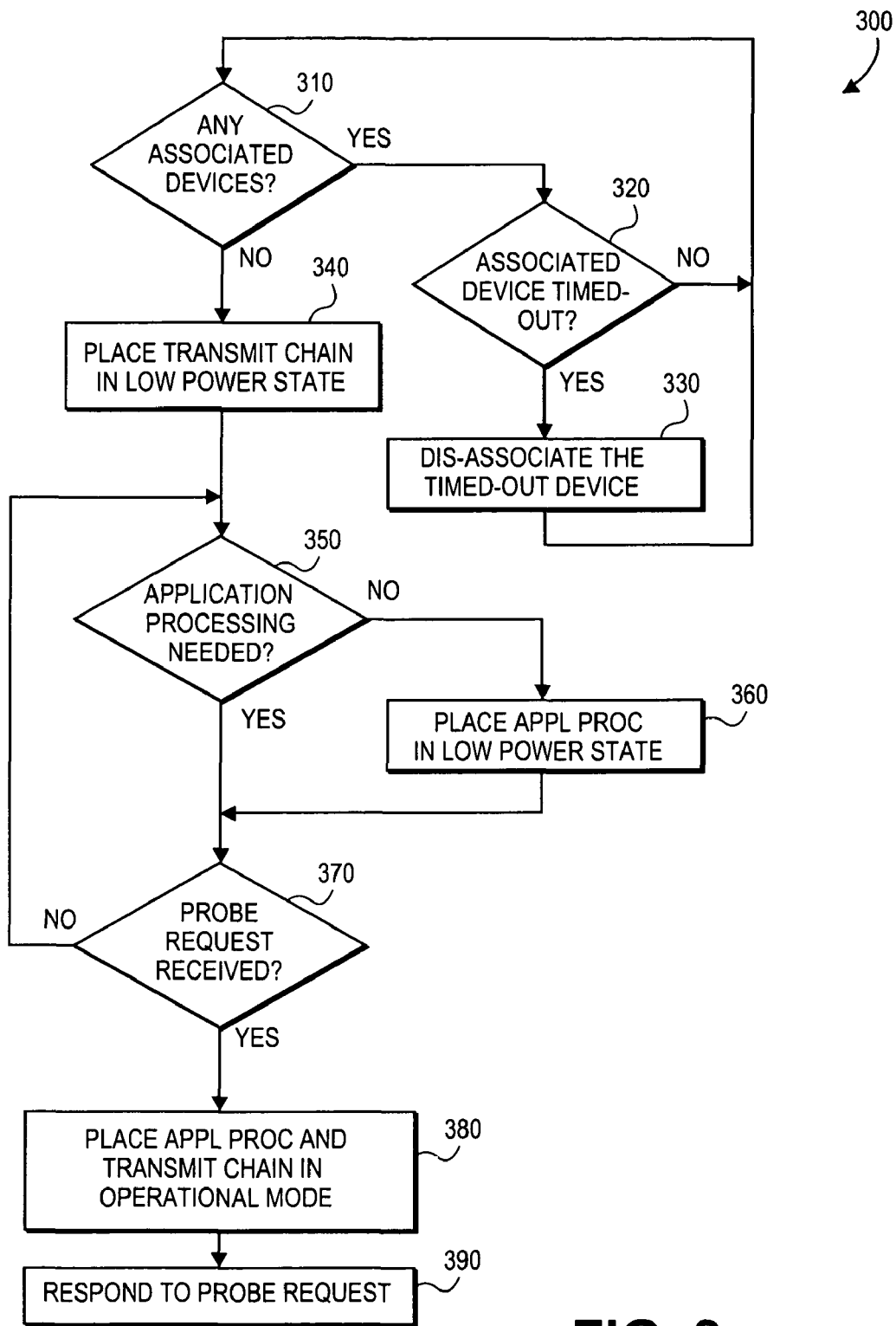
FIG. 3 shows a flow diagram of a method of using a standby mode in a network controller, according to an embodiment of the invention.

FIG. 3 shows a flow diagram of a method of using a standby mode in a network controller, according to an embodiment of the invention. In flow diagram 300, operations 310, 320, and 330 may be used to determine when to enter the standby mode (it is assumed that the network controller is in an operating mode during these operations). At 310, it may be determined if there are any network devices currently associated with the network controller. If so, each of those network devices may be monitored until it shows no useful communications for a pre-determined period of time, as determined at 320, and then it may be disassociated from the network controller at 330. Of course, other devices may request and be granted association (not shown) during the operations 310-320-330, which will keep this loop active.

When there are no longer any network devices associated with the network controller, the network controller may be placed into a standby mode by placing the transmit chain into a non-operational low power state at 340. In some embodiments, the network controller may need to have no associated devices for a predetermined period of time before it may enter the standby mode. It is possible that the applications processor may need to continue processing one or more applications even after communication has stopped. Therefore, in some embodiments the applications processor will be placed into a non-operational low power state separately from the transmit chain, as indicated at 350-360, only when no applications processing is needed. In other embodiments (not shown), the transmit chain will not be placed into the low power state until the applications processor is also ready to be placed into the low power state.

The network controller may remain in the standby mode, looping through 350-360-370, until a communications request that meets the network controller's requirements is received at 370. At that time, the network controller may be placed in an operational mode by restoring the applications processor and the transmit chain to an operational state at 380. (This assumes the receive chain and communications processing section are still in an operational state.) The network controller may then respond to the communications request at 390, such as by transmitting a response. Further communications may also take place. A communications request may frequently result in the requesting device becoming associated with the network controller. In any event, when the network eventually becomes inactive again, operations 310-320-330 may place it in standby mode again as previous described.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising
   a wireless network controller comprising:
   a receive chain, a transmit chain, and a communications processing section coupled to the receive chain and the transmit chain; and
   a power control circuit coupled to the receive chain, the transmit chain and the communications processing section, to selectively provide operating power to the receive chain, the transmit chain, and the communications processing section;
   wherein the power control circuit is to place the transmit chain in a non-operational low power state but keep the receive chain and the communications processing section in an operational state, responsive to no network devices being associated with the wireless network controller; and
   an applications processor, wherein the power control circuit is to place the applications processor into the non-operational low power state responsive to both of no network devices being associated with the network controller and no applications being run by the applications processor.

2. The apparatus of claim 1, wherein the communications processing section includes a digital signal processor and probe detect logic, but excludes a communications processor.

3. The apparatus of claim 1, wherein the communications processing section includes a digital signal processor and a communications processor.

4. The apparatus of claim 1, wherein the network controller further comprises an applications processor, and the power control circuit is to place the applications processor into the non-operational low power state responsive to no network devices being associated with the network controller.

5. The apparatus of claim 1, wherein the communications processing section is to decode communications requests received through the receive chain while the transmit chain is in the non-operational low power state.

6. The apparatus of claim 5, wherein the power control circuit is to place the transmit chain into an operational state responsive to the communications processing section decoding a communications request while the transmit chain was in the non-operational low power state.

7. The apparatus of claim 5, wherein the power control circuit is to place the transmit chain into an operational state responsive to the communications processing section decoding a directed communications request while the transmit chain was in the non-operational low power state.

8. The apparatus of claim 5, wherein the network controller further comprises an applications processor, and the power control circuit is to place the transmit chain and the applications processor into an operational state responsive to the communications processing section decoding a communications response while the transmit chain and the applications processor were both in the non-operational low power state.

9. The apparatus of claim 1, further comprising at least one antenna coupled to the receive chain and to the transmit chain.

10. A method, comprising:
    placing a transmit chain in a wireless network controller into a non-operational low power state responsive to determining that no wireless communications devices are currently associated with the wireless network controller;
    maintaining a receive chain and a communications processing section in an operational state while the transmit chain is in the non-operational low power state;
    detecting a communications request received through the receive chain while the transmit chain is in the non-operational low power state;
    restoring the transmit chain to an operational state responsive to said detecting;
    transmitting a communications response; and
    placing an applications processor into the non-operational low power state responsive to both of said determining that no wireless communications devices are currently associated with the network controller and determining that no applications are currently being run by the applications processor.

11. The method of claim 10, further comprising:
    placing an applications processor into the non-operational low power state responsive to said determining that no wireless communications devices are currently associated with the wireless network controller; and
    restoring the application processor to the operational state responsive to said detecting.

12. The method of claim 10, wherein said detecting is responsive to detecting a directed communications request but not responsive to detecting a broadcast communications request.

13. The method of claim 10, wherein said detecting comprises detecting either of a directed communications request and a broadcast communications request.

14. An article comprising
    a tangible machine-readable medium that contains instructions, which when executed by one or more processors result in performing operations comprising:
    placing a transmit chain in a wireless network controller into a non-operational low power state responsive to determining that no wireless communications devices are currently associated with the wireless network controller;
    maintaining a receive chain and a communications processing section in the wireless network controller in an operational state while the transmit chain is in the non-operational low power state;
    detecting a communications request received through the receive chain while the transmit chain is in the non-operational low power state;
    restoring the transmit chain to an operational state responsive to said detecting;

transmitting a communications response; and placing an applications processor into the non-operational low power state responsive to both of said determining that no wireless communications devices are currently associated with the network controller and determining that no applications are currently being run by the applications processor.

15. The medium of claim 14, wherein the operations further comprise:

placing an applications processor into the non-operational low power state responsive to said determining that no wireless communications devices are currently associated with the wireless network controller; and restoring the application processor to the operational state responsive to said detecting.

16. The medium of claim 14, wherein the operation of detecting comprises detecting a directed communications request but does not comprise detecting a broadcast communications request.

17. The medium of claim 14, wherein the operation of detecting comprises detecting either of a directed communications request and a broadcast communications request.

* * * * *